United States Patent [19]

Dymarkowski

[11] Patent Number: 5,366,168
[45] Date of Patent: Nov. 22, 1994

[54] YARD WASTE LIQUEFIER

[76] Inventor: Paul F. Dymarkowski, 3960 Imperial Blvd., Toledo, Ohio 43623

[21] Appl. No.: 131,334

[22] Filed: Oct. 4, 1993

[51] Int. Cl.⁵ .............................................. B02C 23/36
[52] U.S. Cl. ................................ 241/101.7; 241/46.17
[58] Field of Search ................ 241/21, 46.017, 46.02, 241/46.17, 46.11, 282.1, 101.7

[56] References Cited

U.S. PATENT DOCUMENTS

| | | | |
|---|---|---|---|
| 2,536,372 | 1/1951 | Jordan | 4/187 |
| 2,789,772 | 4/1957 | Williamson | 241/46.02 |
| 2,902,228 | 9/1959 | Higer | 241/46.017 |
| 3,901,451 | 8/1975 | Lemke et al. | 241/38 |
| 4,272,031 | 6/1981 | Jines | 241/46.17 |
| 4,595,148 | 6/1986 | Luerken et al. | 241/92 |
| 4,682,740 | 7/1987 | Conigliaro et al. | 241/282.1 |
| 4,860,961 | 8/1989 | Hilgarth | 241/92 |
| 4,881,690 | 11/1989 | Maier | 241/82.3 |
| 5,018,672 | 5/1991 | Peck et al. | 241/37.5 |
| 5,085,375 | 2/1992 | Haworth | 241/92 X |
| 5,102,056 | 4/1992 | Ober | 241/55 |

*Primary Examiner*—Douglas D. Watts
*Attorney, Agent, or Firm*—Emch, Schaffer, Schaub & Porcello Co.

[57] ABSTRACT

The invention is a device for dispersing yard waste having a tank for receiving a predetermined quantity of yard waste and liquid. At least one rotatable blade is positioned in the tank. The blade is disposed to engage and cut the yard waste. A baffle is positioned in the tank adjacent the blade. The baffle has a plurality of cutting members that are positioned substantially perpendicular to the plane of rotation for the rotatable blade. The cutting members have a sharp edge that cuts and redirects the yard waste in the tank. The rotatable blade and baffle produce a substantially liquefied slurry from the yard waste and liquid in the tank. A pump is provided for discharging the slurry from the tank.

13 Claims, 3 Drawing Sheets

YARD WASTE LIQUEFIER

BACKGROUND ART

FIELD OF THE INVENTION

This invention relates to a machine for dispersing yard waste mainly grass, leaves and other vegetation. More particularly, the device receives a predetermined quantity of yard waste and liquid and produces a substantially liquified slurry from the yard waste and liquid. The substantially liquified slurry can then be pumped from the device and the slurry acts as a fertilizer. The slurry can be pumped back onto the yard from which the waste was collected or pumped onto agricultural fields and may act as a growth enhancer. The substantially liquified slurry is absorbed into the vegetation and ground and does not leave an unsightly residue.

There are several prior art devices that are available to shred yard waste, such as leaves, grass, and possibly small branches. These devices are primarily shredders that take the yard waste and cut the yard waste into smaller pieces to reduce the volume of the yard waste in some applications and to make the yard waste easier to handle. However, the yard waste is still in solid form and it is difficult to dispose of the yard waste without having unsightly conditions. If the yard waste from one of these shredding devices is put back onto the yard, there is just a smaller more finely cut version of the yard waste placed back on the yard and it will take considerable time for this yard waste to decompose to an extent where it is no longer noticeable or objectionable in appearance.

Currently local governments are coming under a great deal of pressure to reduce the amount of material that is placed in landfills. Many local governments have either reduced or eliminated the quantity of grass clippings or leaves that will be picked up by sanitation workers. There have also been restrictions placed on the landfills themselves so that they will not accept yard waste such as grass clippings and leaves. The space in the landfills has become too valuable to allow it to be taken up with large quantities of grass clippings and leaves. At the same time land owners have become accustomed to having very manicured yards and grass catching lawn mowers are extensively used in the United States. There has currently been a trend to go to mowers that mulch the grass which produces a finer or smaller grass clipping that can be discharged back onto the lawn. However, the mulching type lawn mowers frequently leave a significant residue of grass clippings that can be unsightly and can take a considerable time to decompose. There is also the possibility that the grass clippings from the mulching mower will build up an undesirable level of thatch in the lawn that over a period of time can have a detrimental effect on the lawn. If the thatch builds up, it is necessary to remove the thatch which again produces large quantities of yard waste that must be disposed of. In the fall the leaves from the trees create a similar problem but it is even more difficult to effectively mulch or chop up the leaves with a lawn mower without leaving an unacceptable residue on the lawn. The lawn clippings and chopped leaves are also frequently tracked into the house causing additional undesirable impact on the homeowner.

The present invention eliminates the above difficulties by producing a substantially liquified slurry from the yard waste and this slurry can then be discharged from the device back onto the lawn or onto agricultural sites. Since the yard waste is now in a substantially liquified slurry it is absorbed by the vegetation and the soil and does not have an unattractive presence. The slurry of yard waste also provides an effective fertilizer for the lawn or the agricultural vegetation that is an added benefit.

DISCLOSURE OF THE INVENTION

The present invention is directed to a device and method for dispersing yard waste. The device has a tank for receiving a predetermined quantity of yard waste and a predetermine quantity of liquid. At least one rotating blade is positioned in the tank and the blade is disposed to engage and cut the yard waste. A stationary baffle is positioned in the tank adjacent the blade. The baffle has a plurality of members that are positioned substantially perpendicular to the plane of rotation for the blade. The members have a sharp edge that further cuts and redirects the waste material in the tank. The blade and the baffle produce a substantially liquified slurry from the yard waste and liquid in the tank. A pump means is operatively connected to the tank for recirculating and discharging the slurry from the tank.

In the method for dispersing yard waste a predetermine quantity of yard waste and liquid is positioned in a tank. At least one blade is rotated in the tank to engage and cut the yard waste. The yard waste is directed against a stationary baffle positioned in the tank where the baffle has a plurality of members positioned substantially perpendicular to the plane of rotation of the blade. The members have a shape edge that further cuts and redirects the waste material in the tank. The blade and the baffle produce a substantially liquified slurry from the yard waste and liquid in the tank. Once the yard waste and liquid is formed into a substantially liquified slurry it is discharged from the tank.

BRIEF DESCRIPTION OF THE DRAWINGS

FIG.. 1 is a side elevation view, partially broken away of the yard waste liquefier of the present invention.

BEST MODE OF CARRYING OUT INVENTION

Figure 1:
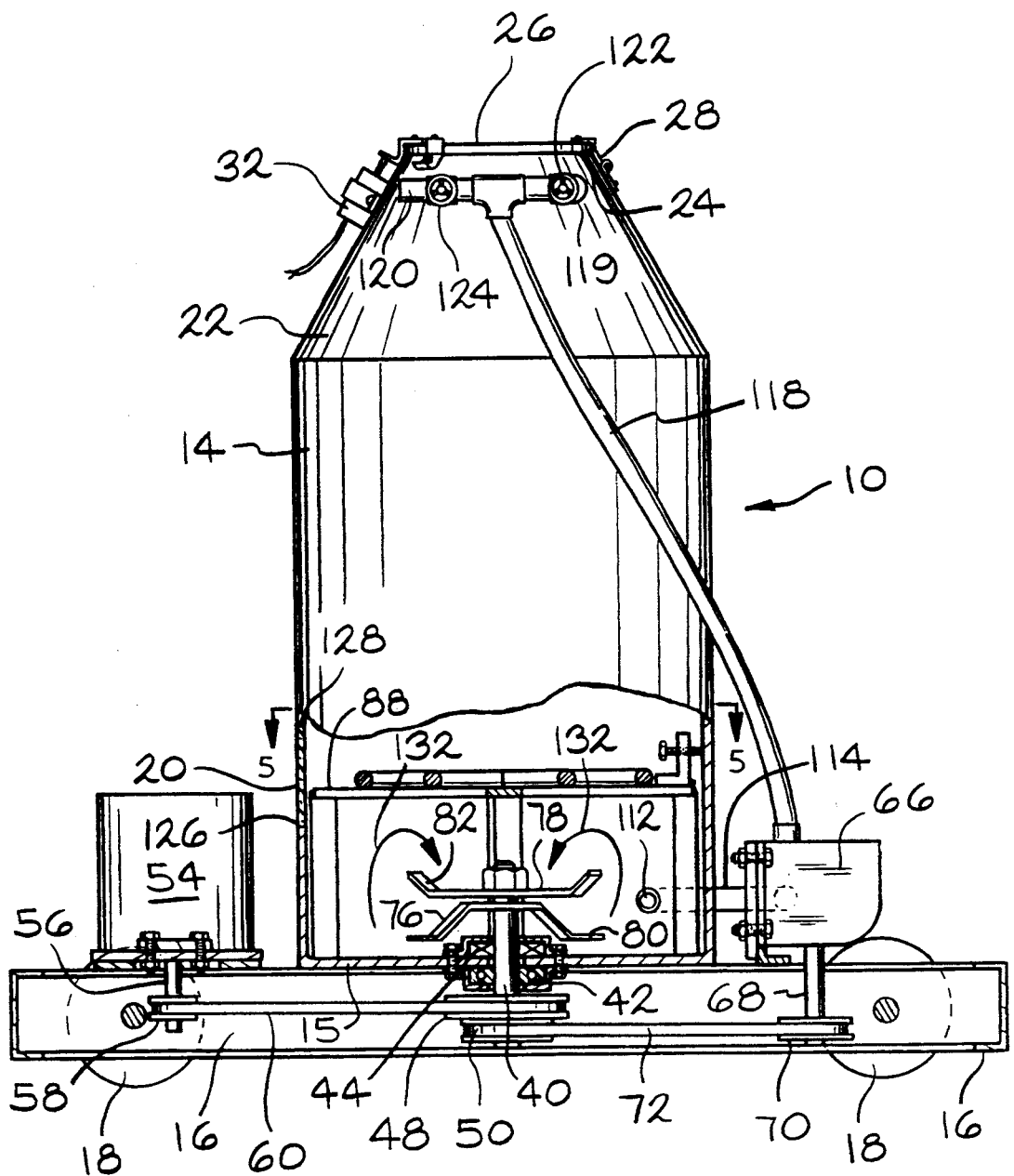
Figure 2:
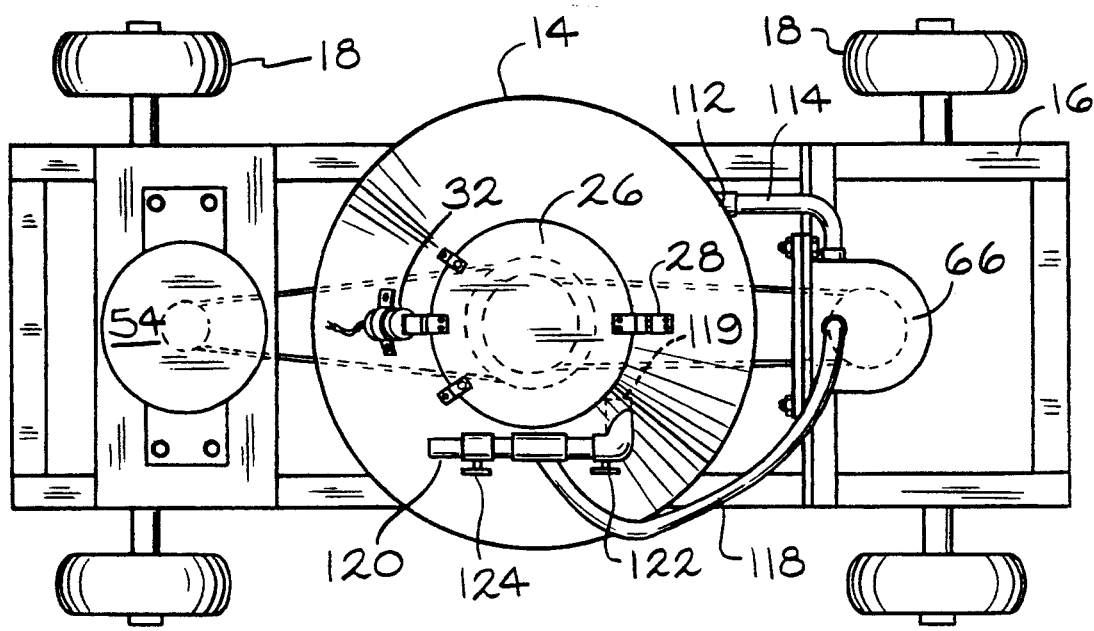
FIG. 2 is a top view of the invention.

The invention is directed to a device for dispersing yard waste. More particularly, the device receives a predetermined quantity of yard waste and liquid, and rotating blades and a stationary baffle in the device produces a substantially liquified slurry from the yard waste and liquid. A substantially liquified slurry can then be pumped from the device back onto the yard to provide an effective and clean method of disposing of yard waste.

The dispersing device 10 has a substantially cylindrical tank 14 that is positioned on a substantially rectangular frame 16. Wheels 18 can be mounted on the frame 16 to make the device movable. The tank 14 has a substantially cylindrical lower portion 20 that is secured to the frame 16. The upper portion 22 of the tank 14 is generally converging as it moves away from the frame 16 and terminates in an opening 24. A lid 26 is hingeably secured to the upper portion 22 of the tank 14 that forms the opening 24 by means of a hinge 28. The lid 26 is constructed so that it completely closes the opening 24 in the upper portion 22 of the tank 14. A safety switch 32 is positioned on the upper portion 22 of the tank 14 that forms the opening 24 on the side of the tank that is opposite to the hinge 28. The safety switch 32 is disposed to be engaged by the lid 26 when the lid is positioned to close the opening 24 in the tank 14.

A rotatable shaft 40 extends through the bottom wall 15 of the tank 14. The rotatable shaft is positioned in a bearing 42 that is secured to the bottom wall 15 of the tank 14. A seal 44 is positioned around the rotatable shaft 40 in the interior of the tank 14 to form a liquid-tight seal between the rotatable shaft and the bottom wall 14 of the tank. The rotatable shaft 40 is disposed to be substantially parallel to the longitudinal axis of the tank 14. A first drive pulley 48 and a second drive pulley 50 are mounted on the portion of the rotatable shaft 40 that extends from the tank 14. A motor 54 is positioned on the frame 16 adjacent to the tank 14. A drive shaft 56 and clutch pulley 58 extends from the motor 54 and are operatively connected to the first drive pulley 48 by belt 60.

A pump 66 is positioned on the frame 16 adjacent to the tank 14. The pump 66 is usually positioned on the frame 16 in a position on the opposite side of the tank 14 from the motor 54. A shaft 68 and pulley 70 extend from the pump 66 and are operatively connected to the second drive pulley 50 by belt 72.

Mounted on the end of the rotatable shaft 40 that extends into the interior of the tank 14 is first blade 76 and second blade 78. The first blade 76 is positioned between the bottom wall 15 and the second blade 78. The first and second blades are securely mounted to the rotatable shaft 40 so that the blades rotate when the rotatable shaft 40 is caused to rotate. The first blade 76 has an angled section 77 and an outer cutting surface 80 that is radially positioned from the rotatable shaft 40. The outer cutting surface 80 is displaced in a direction towards to bottom wall 15 of the tank 14 from the second cutting blade 78. The cutting surface 80 is disposed substantially parallel to the bottom wall 15 of the tank 14. The outer cutting surface 80 is spaced from the main portion of the second cutting blade 78 a distance from about 1½ to about 3½ inches. The second blade 78 has a cutting portion 82 that is radially spaced from the rotatable shaft 40. The cutting portion 82 of the second blade 78 is disposed at an angle with respect to the plane formed by the bottom wall 15 of the tank 14. The cutting portion 82 of the second blade 78 is disposed at an angle from about 30° to about 60° from the bottom 15 of the tank. The first and second cutting blades are substantially the same length and this length is from about 65 to about 85 percent of the diameter of the lower portion 20 of the tank 14. The cutting surface 80 on each end of the first blade 76 and the cutting portion 82 on each end of the second blade 78 have a length that is from about 10 to about 15 percent of the length of the first or second blade.

Figure 3:
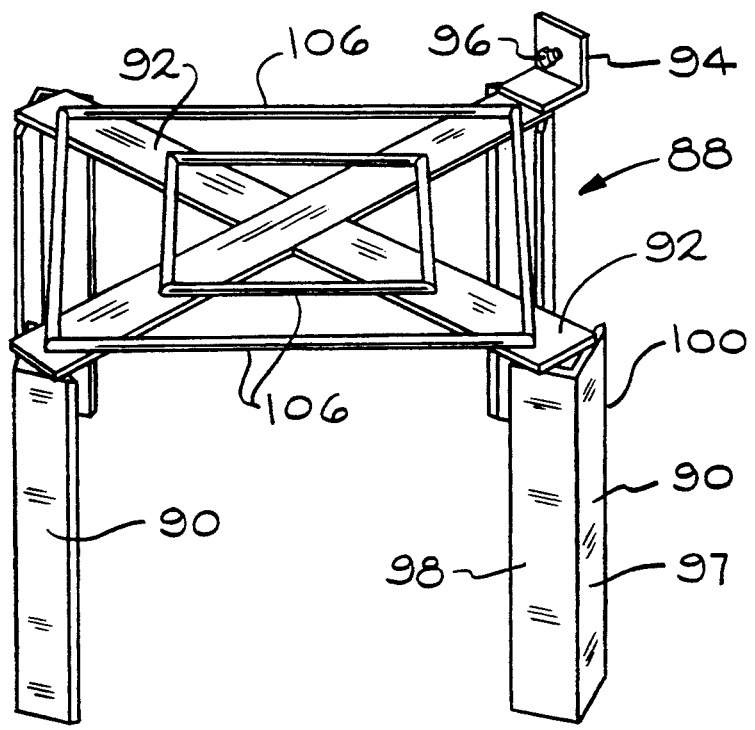
FIG. 3 is a perspective view of a component of the invention.
Figure 4:
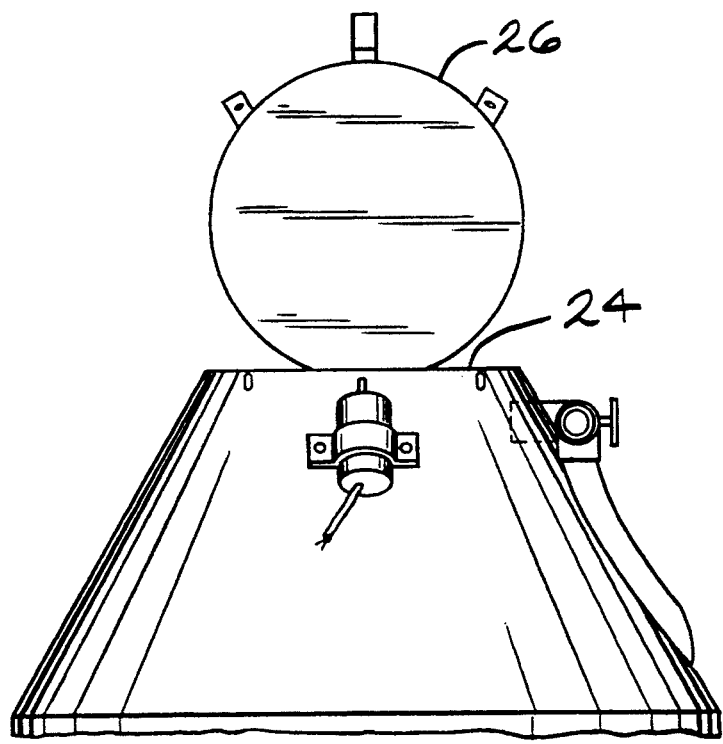
FIG. 4 is a partial side elevation view of the top of the yard waste liquefier.
Figure 5:
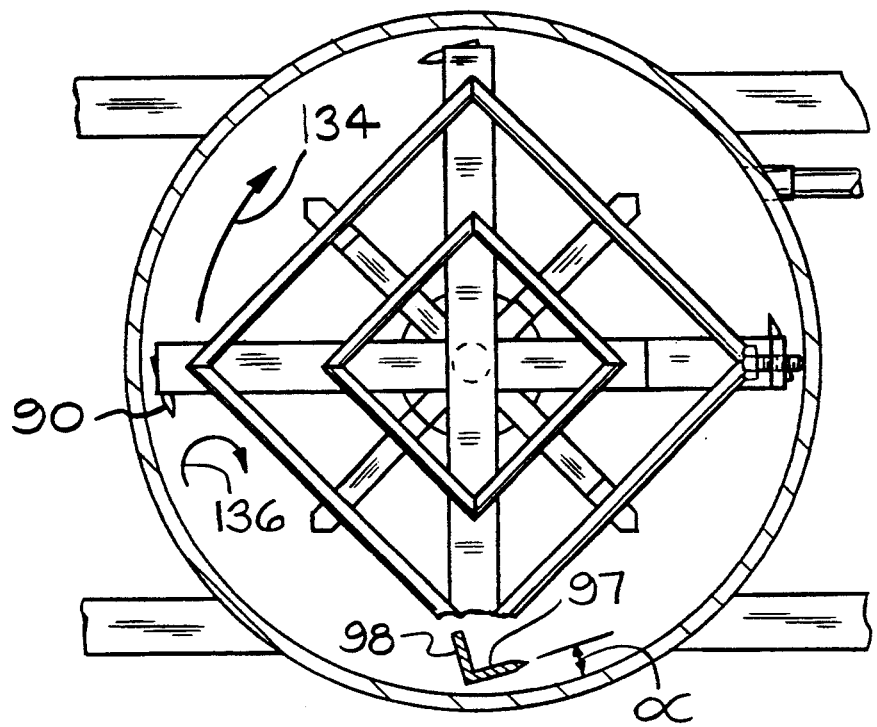
FIG. 5 is a cross-sectional view, partially broken away, taken along line 5—5 in FIG. 1.

Positioned in the tank 14 adjacent to the first blade 76 and second blade 78 is a baffle 88. The baffle 88 has a plurality of cutting members 90 that extend from the bottom wall 15 of the tank in a direction towards the opening 24 of the tank. The cutting members 90 are positioned in the lower portion 22 of the tank 14. The cutting members 90 are disposed so they are positioned substantially against the outer wall of the lower portion 22 of the tank 14 and are substantially perpendicular to the bottom wall 15 of the tank 14. As shown in FIGS. 3 and 5, there are four cutting members 90 associated with the baffle 88. However, it should be understood that a different number of cutting members can be utilized with the baffle 88. In practice, however, it has been found that at least two cutting members 90 should be used with the baffle. The cutting members 90 positioned in spaced apart relationship to the first and second blades. The cutting members are located out of the path of rotation for the first and second blades. The cutting members 90 are held in place by support members 92 that are connected to the tops of the cutting members 90 that are spaced apart from the bottom wall 15 of the tank 14. The support members 92 extends from opposed cutting members 90 and the support members can be secured to one another where they meet in the center of the tank 14. A flange 94 is positioned on at least one of the support members 92 and a bolt 96 is threadingly positioned in the flange 94. The bolt 96 can be advanced in the flange 94 to engage the wall of the tank 14 whereby the baffle 88 will be held in position in the tank. The baffle is intended to be stationary and is not to rotate within the interior of the tank.

The cutting members 90 are generally an L-shaped member having a first leg 97 and a second leg 98 with a sharp edge 100 position on the first leg 97 that is disposed to engage and further cut the yard waste positioned in the tank 14. The second leg 98 is positioned to redirect yard waste in the tank 14 that is caused to move by the rotating first and second blades. The cutting members 90 are disposed at an angle $\alpha$ from about 5° to about 25° to the outer wall of the tank 14. (See FIG. 5).

Positioned on the support members 92 are a plurality of stringers 106. The stringers are normally cylindrical in shape and they are positioned so that there is approximately from about 1 to about 5 inch space between the stringers 106. The stringers 106 are disposed to prevent large objects from reaching the first and second blades and increase the safety of the device.

Located in the lower portion 20 of the tank 14 there is a suction port 112. The suction port 112 is connected by suction pipe 114 to pump 66. Also operatively connected to the pump 66 is recirculation pipe 118. The recirculation pipe extends from the pump 66 up to a recirculation port 119 in the upper portion 22 of the tank 14. Connected to the recirculation pipe 118 is discharge pipe 120. A recirculation valve 122 is positioned on the recirculation pipe 118 and a discharge valve 124 is positioned on the discharge pipe 120 to control the flow of fluid from the pump 66.

Positioned on the side of the tank 14 in the lower portion 20 there is a level indicator 126 that establishes the level to which yard waste should be positioned in the tank 14. Also on the side of the tank 14 in the lower portion 20 there is a liquid level indicator 128 that establishes the quantity of liquid that should be added to the yard waste already positioned in the tank. In most applications the liquid that is added to the yard waste in the tank is water.

In operation the lid 26 on the tank 14 is opened and yard waste positioned in the tank up to the level indicator 126 found on the side of the tank 14. Liquid is then added to the tank up to the level of the liquid level indicator 128 on the side of the tank 14. Once the proper quantity of yard waste and liquid is positioned in the tank, the lid 26 is closed in a manner so that safety switch 32 is engaged. It is necessary to engage the safety switch 32 with the lid 26 so that the motor 54 can be started. Unless the lid is closed and the safety switch 32 engaged, the safety switch will disengage the starter for the motor 54.

Once the tank is properly filled, the motor 54 is started which causes the drive shaft 56 to rotate. The rotating drive shaft 56 and pulley 58 drives belt 60 which is connected to the first drive pulley 48 on the rotatable shaft 40. The moving drive belt 60 causes shaft 40 to rotate which causes the first blade 76 and second blade 78 to rotate in the lower portion 20 of the tank 14. The outer cutting surface 80 and cutting portion 78 of the first and second cutting blades, respectively, are disposed to engage the yard waste to reduce the size of the yard waste and act with the liquid in the tank 14 to produce a substantially liquified slurry of yard waste and water. The first and second blades also act to direct the material in the tank 14 in the manner shown in the arrows 132 in FIG. 1. Basically, the first and second blades cause the material in the tank 14 to be directed upwardly and folded back into the center of the tank where the material again engages the first and second blades. The material in the tank 14 is also caused to rotate in a substantially circular direction by the rotation of the first and second blades. The direction for rotation of the blades is shown by the arrow 134 in FIG. 5 and the material in the tank rotates in the same general direction. When the material in the tank is rotated by the blades it engages the cutting members 90 of the baffle 88. The sharp edge 100 on the on the first leg 97 of members 90 further cuts and reduces the size of the yard waste to assist in producing a substantially liquified slurry of yard waste and water. The second leg 98 of the cutting members 90 also act to redirect the material in the tank 14 in the direction shown by arrow 136 in FIG. 5. This redirecting of the material in the tank 14 causes the material to be directed against the sharp edge 100 of the cutting members 90 and further cut or reduced in size.

The rotation of rotatable shaft 40 also causes belt 72 to rotate the shaft 68 connected to the pump 66. The operation of the pump 66 causes a suction in suction port 112 that draws material from the interior of the tank 14 into the suction port and into the pump 66. The material is pumped from the pump into the recirculation pipe 118 and when recirculation valve 122 is open and discharge valve 124 is closed the material is thereby directed into the recirculating port 119 in the upper portion 22 of the tank 14. Thus, the material in the tank 14 is recirculated from the bottom of the tank 14 into the upper portion 22 in the tank to further assist in cutting and liquefying the yard waste.

In a normal operating cycle the motor 54 will be operated from about 3 to about 10 minutes to ensure that the yard waste is substantially liquified in the tank 14. Once the yard waste has been substantially liquified the recirculation valve 122 is closed and discharge valve 124 is opened so that the material pumped from the pump 66 is directed from recirculation pipe 118 into discharge pipe 120 whereby the substantially liquified slurry of yard waste can be discharged from the tank 14. In most applications it is anticipated that the yard waste can be discharged back onto the yard from which it was collected and that the substantially liquified slurry of yard waste will act as a fertilizer or provide nutrients for the yard. Since the yard waste is in a substantially liquified slurry form it is easily absorbed by the grass and ground with little or no build-up of material. The substantially liquified slurry of yard waste can also be discharged on to agricultural fields or other areas that can benefit from the nutrients in the yard waste.

The stringers 106 positioned on the support member 92 of the baffle 88 are positioned to break up and separate the yard waste that is positioned in the tank 14. As previously described, the stringers are positioned approximately 3–5 inches apart and have a rounded shape. Accordingly, as the yard waste is positioned in the tank 14 it will hit the stringers and be broken up so that overly large clumps of yard waste are not packed around the first and second blades. This reduces the load on the motor 54 and allows the first and second blades and the cutting members 90 of the baffle 88 to act more effectively in substantially liquefying the yard waste. Since the stringers 106 have a round shape it is very difficult for the yard waste to build-up on the stringers. Normally, the yard waste will easily fall off the stringers into the lower portion 20 of the tank 14. The stringers 106 also provide additional safety as it is more difficult for a large unwanted object to enter the cutting and liquefying region of the device 10.

The above description is given for the sake of explanation. Various modifications and substitutions, other than those cited, can be made without departing from the scope of the following claims.

I claim:

1. A device for dispersing yard waste comprising:
   a tank for receiving a predetermined quantity of said yard waste and a predetermined quantity of liquid, said tank having a substantially cylindrical lower portion and an upper portion that converges to form an opening;
   a lid hingably connected to said upper portion of said tank, said lid being disposed to close said opening in said upper portion of said tank;
   at least one rotatable blade positioned in said tank, said blade being disposed to engage and cut said yard waste;
   a baffle positioned in said tank adjacent said blade, said baffle having a plurality of cutting members positioned substantially perpendicular to the plane of rotation for said rotatable blade, said cutting members having a sharp edge that further cuts and redirects said waste material in said tank, said rotatable blade and said baffle producing a substantially liquified slurry from said yard waste and liquid in said tank;
   pump means for discharging said slurry from said tank;
   a drive motor operatively connected to said rotatable blade and said pump means, said motor acting to cause said blade and said pump means to rotate; and,
   a safety switch positioned on said upper portion of said tank, said safety switch being operatively connected to said drive motor, said safety switch being disposed to be engaged by said lid when said lid closes said opening in the upper portion of said tank, said safety switch being positioned to allow said drive motor to operate only when said lid engages said safety switch.

2. The device of claim 1, wherein two rotatable blades are positioned in said lower portion of said tank, said rotatable blades having substantially the same length.

3. The device of claim 2, wherein said rotatable blades have a length that is from about 65 to about 85 percent of the diameter of said cylindrical lower portion of said tank.

4. A device for dispersing yard waste comprising:
   a tank for receiving a predetermined quantity of said yard waste and a predetermined quantity of liquid, having a substantially cylindrical lower portion and an upper portion that converges to form an opening;
   two rotatable blades positioned in said lower portion of said tank, said rotatable blades having substantially the same length, one rotatable blade having an outer cutting surface that is disposed parallel to said bottom wall of said tank and said other rotatable blade having a cutting portion that is disposed at an angle from about 30° to about 60° with respect to said bottom wall of said tank, said blade being disposed to engage and cut said yard waste;
   a baffle positioned in said tank adjacent said blade, said baffle having a plurality of cutting members positioned substantially perpendicular to the plane of rotation for said rotatable blade, said cutting members having a sharp edge that further cuts and redirects said waste material in said tank, said rotatable blade and said baffle producing a substantially liquified slurry from said yard waste and liquid in said tank; and
   pump means for discharging said slurry from said tank.

5. A device for dispersing yard waste comprising:
   a tank for receiving a predetermined quantity of said yard waste and a predetermined quantity of liquid;
   at least one rotatable blade positioned in said tank, said blade being disposed to engage and cut said yard waste;
   a baffle positioned in said tank adjacent said blade, said baffle having a plurality of cutting members positioned substantially perpendicular to the plane of rotation for said rotatable blade, said cutting members of said baffle are positioned adjacent said rotatable blade and immediately adjacent said wall of said tank, said baffles including, support members connected to said cutting members in said tank, said support members extending between the ends of said cutting members that are spaced apart from the bottom wall of said tank, said cutting members having a sharp edge that further cuts and redirects said waste material in said tank, said rotatable blade and said baffle producing a substantially liquified slurry from said yard waste and liquid in said tank; and
   pump means for discharging said slurry from said tank.

6. A device for dispersing yard waste comprising:
   a tank for receiving a predetermined quantity of said yard waste and a predetermined quantity of liquid;
   at least one rotatable blade positioned in said tank, said blade being disposed to engage and cut said yard waste;
   a baffle positioned in said tank adjacent said blade, said baffle having a plurality of cutting members positioned substantially perpendicular to the plane of rotation for said rotatable blade, said cutting members having a sharp edge that further cuts and redirects said waste material in said tank, said rotatable blade and said baffle producing a substantially liquified slurry from said yard waste and liquid in said tank; and
   pump means for discharging said slurry from said tank, said pump has an inlet that is connected to said tank in the area of said rotatable blade and a discharge that is connected by a valve means to a recirculation port and a discharge pipe, said valve means allowing said material pumped from said tank by said pump to be directed to said recirculation portion whereby said material is recirculated into said tank or to said discharge pipe whereby said material is discharged from said tank.

7. The device of claim 4, wherein said cutting surface and said cutting portion on each end of said rotatable blades have a length that is from about 10 to about 15 percent of the length of said rotatable blades.

8. The device of claim 1, wherein said cutting members of said baffle are positioned adjacent said rotatable blade and immediately adjacent said wall of said tank.

9. The device of claim 5, wherein said support members are operatively connected to said tank to maintain said baffle in the desired position in said tank.

10. The device of claim 6, wherein said recirculation port is located in said portion of said tank that is spaced apart from said bottom wall of said tank.

11. A method for dispersing yard waste comprising:
    placing a predetermined quantity of said yard waste and a liquid in a tank;
    rotating at least one blade in said tank to cut said yard waste;
    directing said cut yard waste against a baffle in said tank, said baffle having a plurality of cutting members positioned substantially perpendicular to the plane of rotation of said blade, said cutting members having a sharp edge that further cuts and redirects said waste material in said tank, said blade and said baffle producing a substantially liquified slurry from said yard waste and liquid in said tank;
    removing said yard waste and liquid from said tank and recirculating said yard waste and liquid to the region of said tank that spaced apart from said rotating blade and baffle whereby said yard waste and liquid is recirculated in said tank and further liquified by said rotating blade and said baffle; and, discharging said slurry from said tank.

12. The method of claim 11 in which said rotating blade redirects said yard waste and liquid in said tank, said rotating blade causing said yard waste and liquid to be directed upwardly and into the center of said tank whereby said rotating blade and baffle recut said yard waste.

13. The method of claim 11 in which said tank has a lid hingeably connected to said tank that closes said tank, said lid engaging a safety switch when said lid is in the closed position, said safety switch prevents said blade from rotating unless said lid is in a closed position.

* * * * *